United States Patent
Svare (10) Patent No.: US 12,461,168 B1
(45) Date of Patent: Nov. 4, 2025

(54) ELECTRICAL CIRCUIT INVESTIGATION DEVICES AND METHODS

(71) Applicant: Mark J. Svare, Princeton, MN (US)

(72) Inventor: Mark J. Svare, Princeton, MN (US)

( * ) Notice: Subject to any disclaimer, the term of this patent is extended or adjusted under 35 U.S.C. 154(b) by 186 days.

(21) Appl. No.: 18/220,555

(22) Filed: Jul. 11, 2023

Related U.S. Application Data (60) Provisional application No. 63/398,976, filed on Aug. 18, 2022.

(51) Int. Cl.
  *G01R 31/52* (2020.01)
  *G01R 31/08* (2020.01)

(52) U.S. Cl.
  CPC ........... *G01R 31/52* (2020.01); *G01R 31/088* (2013.01)

(58) Field of Classification Search
  USPC ....................................................... 324/509
  See application file for complete search history.

(56) References Cited

U.S. PATENT DOCUMENTS

| | | | |
|---|---|---|---|
| 2018/0024181 A1* | 1/2018 | Huang | G01R 1/0408 324/548 |
| 2020/0113146 A1* | 4/2020 | Auguste | A01G 29/00 |

* cited by examiner

*Primary Examiner* — Farhana A Hoque
(74) *Attorney, Agent, or Firm* — Dicke, Billig & Czaja, PLLC (57) ABSTRACT

Test apparatus, systems and methods for conducting and collecting data from electrical circuit experiments that are performed within a controlled environment. In various embodiments, the test apparatus is portable and configured for repeatable experiments and testing. The data collected by one or more sensors can be utilized in the analysis of electrical events that involve electrical circuit performance, short circuits, electrical arcing faults, electrical coordination, fault location, determinations of sequence of events, and electrical investigation and scientific hypothesis testing. For example, such test apparatus, systems, and methods can be utilized in forensic investigations.

20 Claims, 8 Drawing Sheets

ELECTRICAL CIRCUIT INVESTIGATION DEVICES AND METHODS

CROSS-REFERENCE TO RELATED APPLICATIONS

This Non-Provisional Patent Application claims the benefit of the filing date of U.S. Provisional Patent Application Ser. No. 63/398,976, filed Aug. 18, 2022, entitled "ELECTRICAL CIRCUIT INVESTIGATION DEVICES AND METHODS," the entire teachings of which are incorporated herein by reference.

BACKGROUND OF THE DISCLOSURE

1. Field of the Invention

The present invention relates generally to systems, devices and techniques for forensic science, forensic engineering and scientific hypothesis testing in the investigation of electrical circuit performance, damage or events, including, but not limited to, fire damage, explosion damage, mechanical damage, electrical damage and chemical damage.

2. Description of the Related Art

Forensic scientists, engineers and fire investigation practitioners (hereinafter "practitioners") are commonly tasked with collecting, sorting and analyzing data derived from full-scale structure fire experiments and catastrophic losses that involve, fire, explosions, personal injury and equipment damage to learn more about the cause of fires or other electrical events. Prior to developing a final option or conclusion, practitioners develop a scientific hypothesis or theory to be tested. Full-scale fire research experiments are typically financially and environmentally prohibitive. The present disclosure addresses problems and limitations associated with the related art.

SUMMARY

The present disclosure relates to research testing systems that generate scientifically reliable electrical data for forensic investigations or the like. Systems, devices and techniques of the disclosure can be applied in the investigation of electrical damage, including, but not limited to, fire damage, explosion damage, mechanical damage, electrical damage and chemical damage of electrical circuits. A mathematical model was originally theorized and developed to better understand and explain how an electrical circuit responds to heat and flames of fire impingement. One theory of the present disclosure is that the electrical distribution system within a structure will respond to heat and flame impingement during the course of a fire. The practitioner may use the theory for fire origin (location) and cause determinations. Therefore, a mathematical model was developed and tested that resulted in the construction of a new testing system.

In one aspect, the present disclosure provides systems having a test apparatus.

In yet another aspect, the present disclosure provides methods that can be used in the analysis of electrical circuits, which may be damaged or otherwise altered to test a scientific or investigative hypothesis, for example. Such methods can utilize a system including a test apparatus having a chamber defining at least one compartment, a heat source within each compartment, an electrical circuit extending through the at least one compartment, and at least one sensor for each of the at least one compartment. The electrical circuit may be energized at the time of testing. Various methods may include activating the heat source in one or more of the compartments. Methods further include collecting data relating to properties of the electrical circuit with at least one sensor. Alternatively, the heat source can be omitted or provided but not utilized and the electrical circuit, damaged or otherwise, can be tested under a variety of conditions of interest in the replication of an investigation scene within the chamber.

The details of one or more aspects of the disclosure are set forth in the accompanying drawings and the description below. Other features, objects, and advantages of the techniques described in this disclosure will be apparent from the description and drawings, and from the claims.

BRIEF DESCRIPTION OF THE DRAWINGS

In the drawings, in which corresponding reference numerals and letters indicate corresponding parts of the various embodiments throughout the several views, and in which the various embodiments generally differ only in the manner described and/or shown, but otherwise include corresponding parts.

DETAILED DESCRIPTION

Introduction

Systems and methods of the disclosure can serve as a "scaled" testing platform for conducting and collecting data from electrical circuit experiments, which can be performed in a controlled environment. In various examples of the disclosure, the systems are used to test low voltage (i.e., under 600 volts) electrical circuits. Data collected from the system can be utilized in the analysis of electrical events that involve electrical circuit performance, short circuits, electrical arcing faults, electrical coordination, location, sequence of events and/or electrical hypothesis testing, for example. The systems and test apparatus of the disclosure are reusable in some embodiments so that experiments can be repeatedly conducted.

The System

Figure 1:
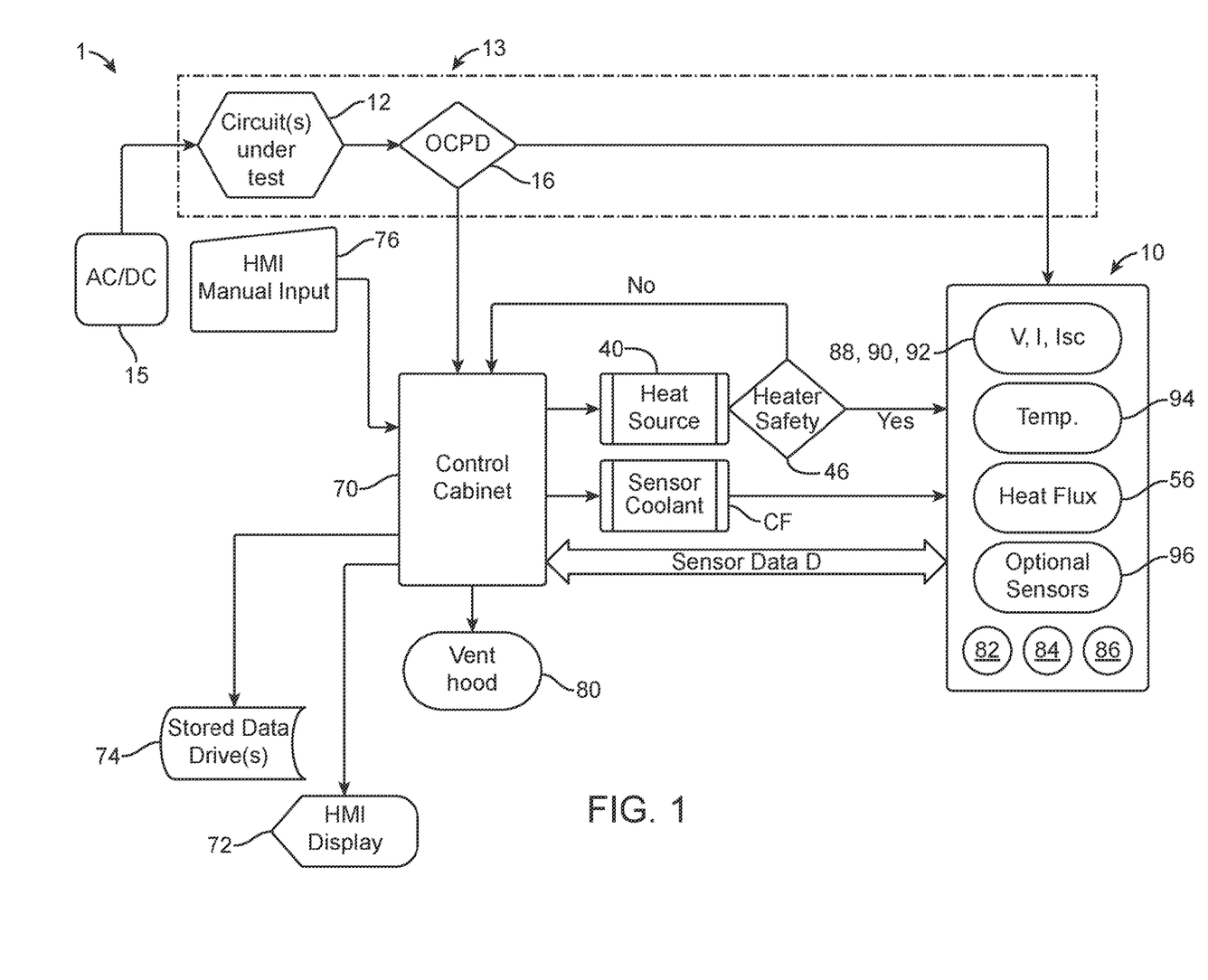
FIG. 1 is a schematic diagram of a system of the disclosure including a test apparatus; wherein additional details regarding the components of the test apparatus are provided in FIGS. 2A-3B.
Figure 2A:
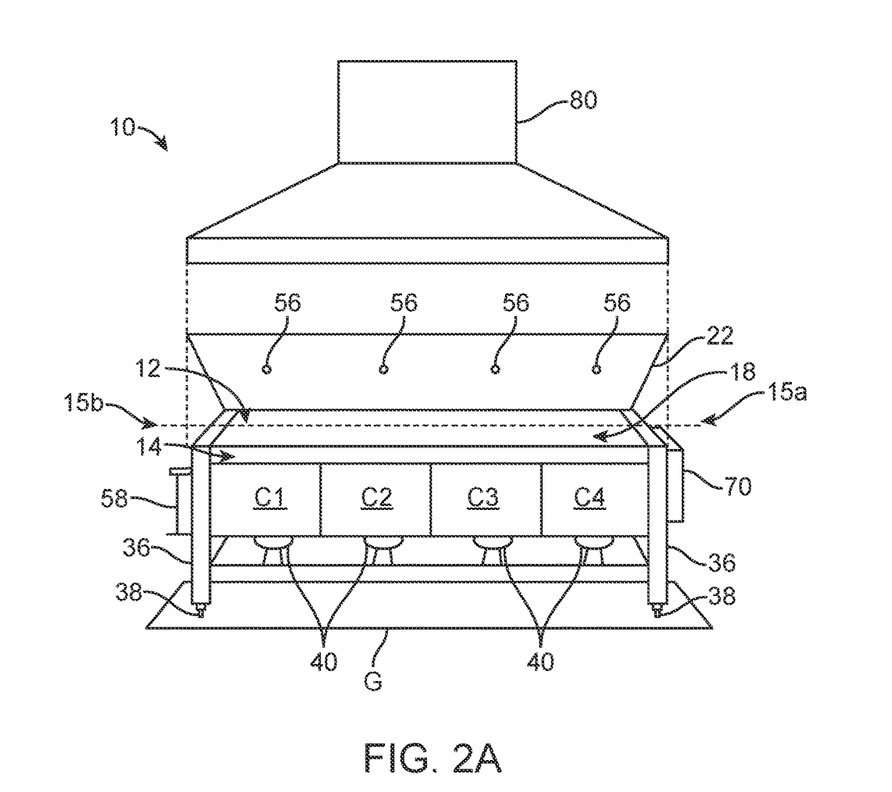
FIG. 2A is a front view of the test apparatus of FIG. 1, which includes a chamber having a plurality of compartments.
Figure 2B:
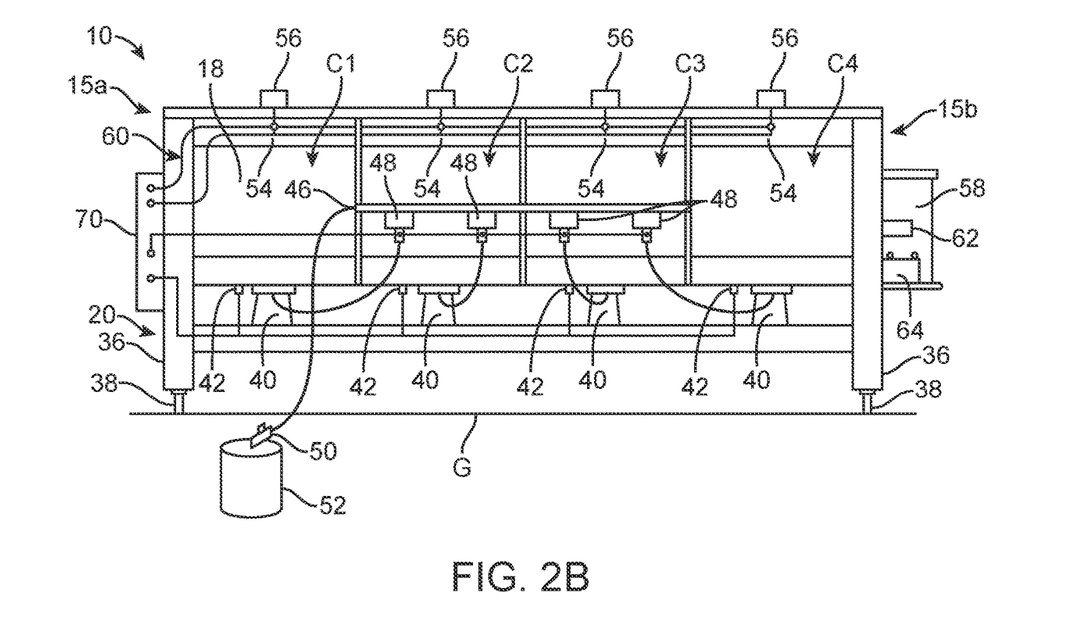
FIG. 2B is a rear view of the test apparatus of FIG. 2A.
Figure 2C:
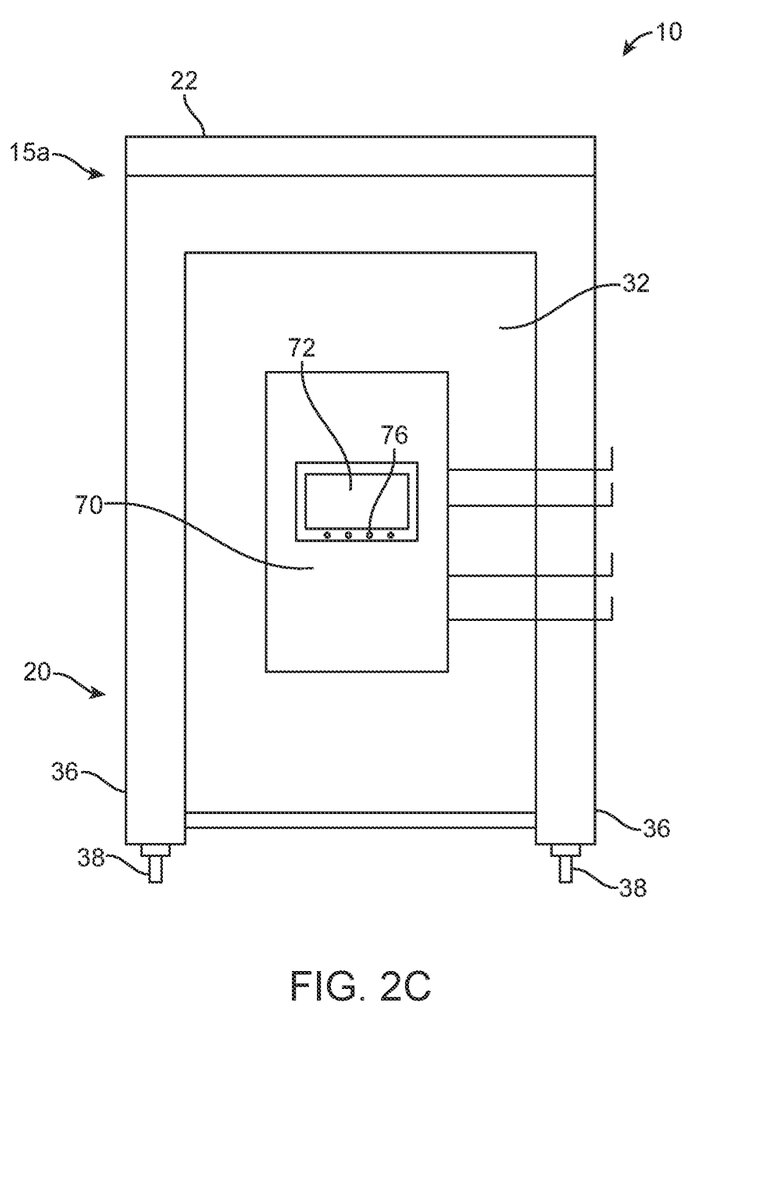
FIG. 2C is a right side view of the test apparatus of FIGS. 2A-2B.
Figure 2D:
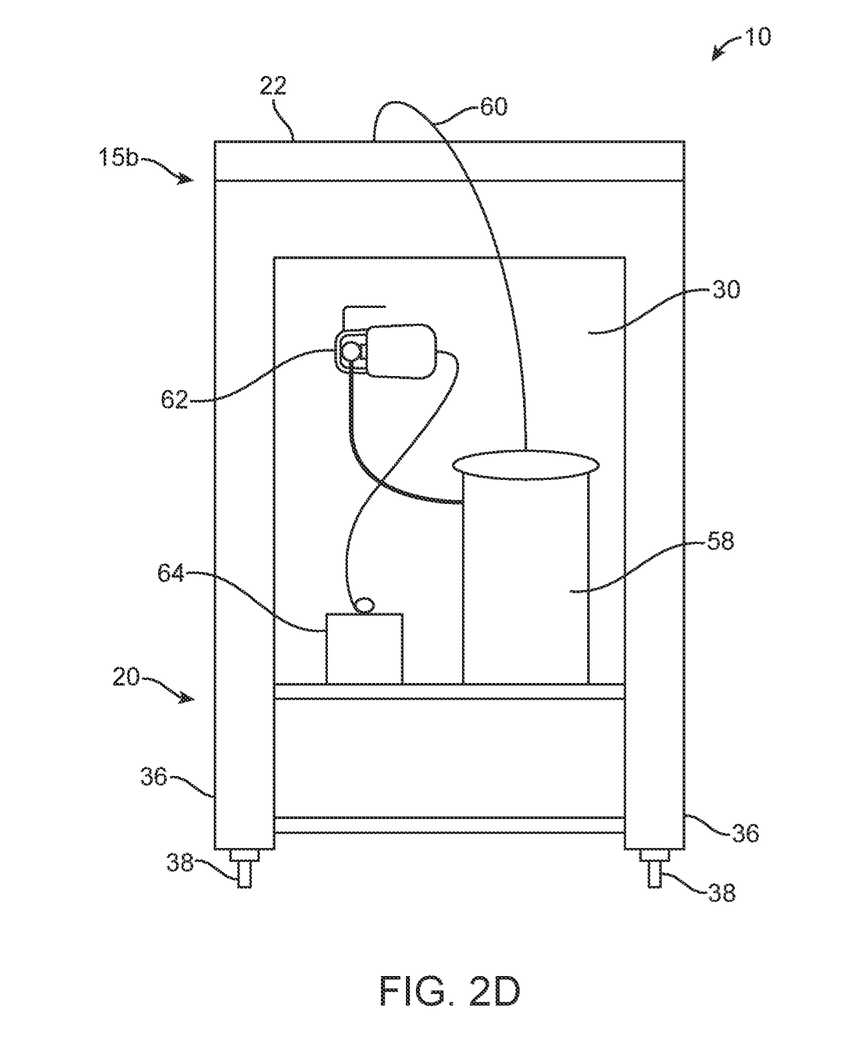
FIG. 2D is a left side view of the test apparatus of FIGS. 2A-2C.
Figure 4:
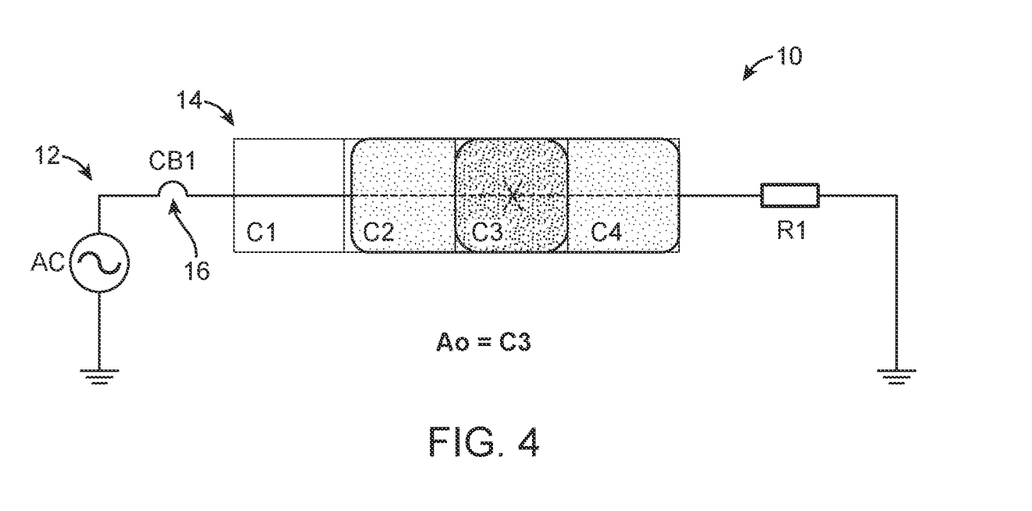
FIG. 4 is a schematic diagram of the test apparatus used in the study of an electrical circuit of Example 1 including an indication and location of the results of the investigation.

FIGS. 1-2D collectively illustrate an exemplary system 1 including a test apparatus 10. In various examples, the system 1 is configured to test and evaluate how one or more electrical circuit(s) or equipment under test 12, which can optionally be provided by a user, responds to heat, flames or other impingement for the purpose of investigating fires or other study. In one example, the test apparatus 10 includes a chamber 14 including a plurality of compartments; one example has four compartments identified as C1, C2, C3, C4. Extending through the first end 15a of the chamber 14 and out the second end 15b of the chamber is the one or more electrical circuit(s) 12 (not shown in FIGS. 2A-2D for clarity, see also FIG. 4 for one example). It is envisioned that internationally recognized radial and ring main configured electrical circuits, which can optionally be incorporated into devices 13 including appliances, equipment, and parts, can be tested within the chamber 14. In one example, as shown in FIG. 4, the electrical circuit 12 includes a circuit breaker CB1 and current source 15 of either alternating current (AC) or direct current (DC). The electrical circuit(s) 12 under test can be of many various configurations and the disclosure is not intended to be limited to any particular configuration. Generally, each electrical circuit 12 under test should be installed to fairly (i.e., as accurately as possible) represent the electrical system and installation conditions known or otherwise calculated, which is to be studied for examination or investigation. Such conditions can include, but are not limited to, circuit voltage, available fault current, circuit impedance, load current, overcurrent protective devices ("OCPD") 16, special protective devices (e.g., residual-current device "RCD", ground-fault circuit interrupter "GFCI", ground fault protection "GFP", arc-fault circuit interrupter "AFCI" or the like), electrical wiring or cabling and grounding. Furthermore, applicable electrical codes, standards, guides organizations can be applied to fairly and accurately represent and/or design the electrical circuit(s) 12 to be tested.

Figure 3A:
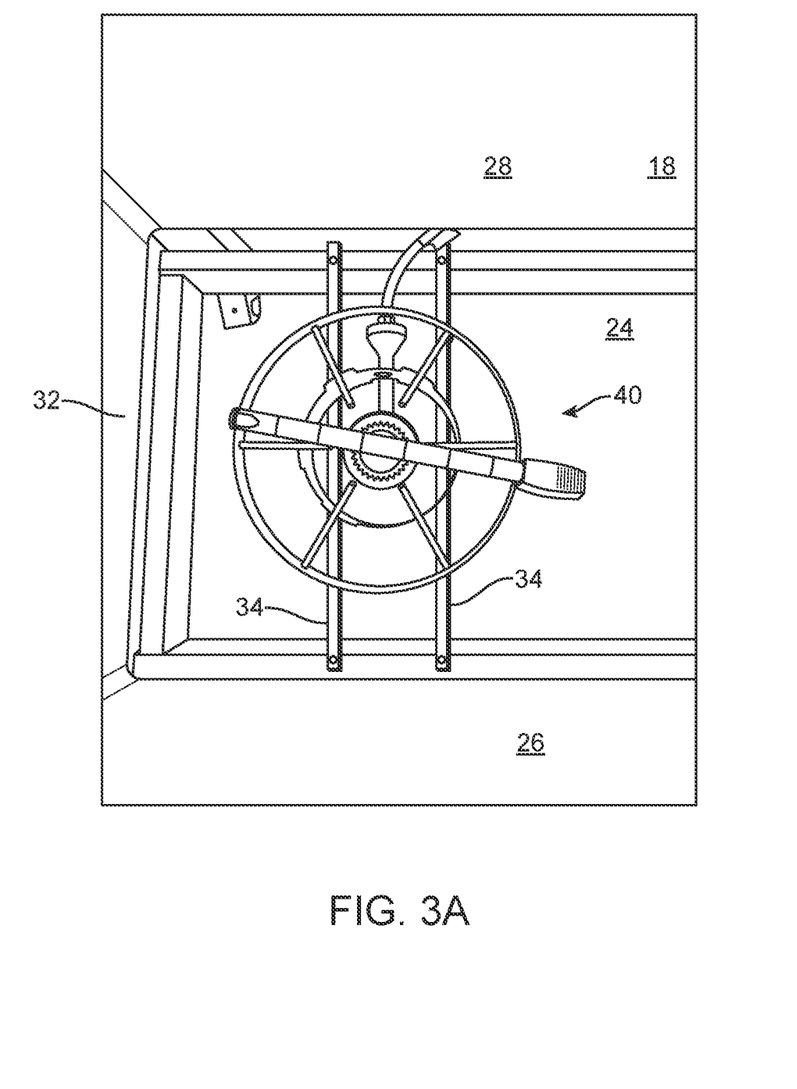
FIG. 3A is a top view of a heat source (in this example, a gas-fueled burner) positioned within one compartment of FIGS. 2A-2D.
Figure 3B:
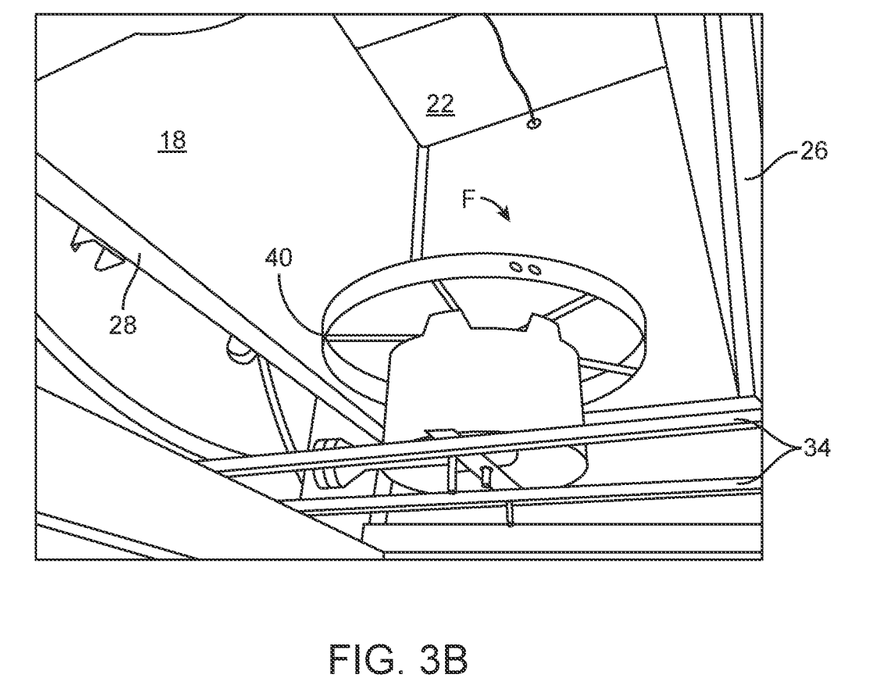
FIG. 3B is a perspective view of the heat source of FIG. 3A ignited within one compartment.

Each compartment C1-C4 can, for example, be constructed, at least in part, out of dimensional lumber, aluminum, steel, stainless steel, or the like, and can be optionally further internally lined 18 (e.g., the liner 18 being 12.5 mm thick) with a non-combustible material such as gypsum board (shown, for example, FIGS. 3A-3B), concrete board, steel, aluminum, or the like. Wood and gypsum wallboard can be utilized to either form the compartments or liner to minimize transfer due to heat loss during experiments. As shown, four compartments C1-C4 can be provided in one non-limiting example. In other embodiments of the disclosure, more or fewer compartments can be provided. The test apparatus 10 can further include a test platform 20 supporting the chamber 14. In one non-limiting example the test platform 20 is 650 mm H×600 mm W×2400 mm L in size or smaller. In some examples of the disclosure, the test apparatus 10 and chamber 14 are relatively "small scale" (i.e., smaller) as compared to the scene to be investigated and sized to be portable. In one example, the test apparatus 10 may be positioned on a ground surface G so that chamber 14 is elevated above the ground G. In various embodiments, the chamber 14 may be 1% or less in volume as compared to the scene to be investigated. In the illustrated example, the plurality of compartments C1-C4 are positioned side-by-side in a serial arrangement. Each of the compartments C1-C4 has an identical width, height, depth, resulting in an equivalent cubic-shaped interior volume defined by a top 22, a bottom 24, front 26, back 28, and side wall 30, 32 for the end compartments C1 and C4 as interior compartments C2 and C3 are provided without side walls in this particular non-limiting example. In other examples, a physical wall or other barrier, with or without an insulating layer, can be provided to physically separate the interior compartments C2 and C3. The bottom 24 can be solid, perforated or consist of one or more slats 34 or other support for holding a heat source 40. In some examples, the bottom 24 may be more of an imaginary planar boundary extending between the bottoms of the respective ends 15a, 15b of the chamber 14. In the example of FIGS. 3A-3B, the bottom includes two slats 34 extending from the front to back 26, 28 on which the heat source 40 is mounted. The bottom 24 is otherwise unobstructed to provide adequate airflow for any flame F produced by the heat source 40. In examples where each compartment C1-C4 doesn't include six physical walls, the optional liner 18 can be limited to only being present on one or more physical walls of the respective compartment. In the illustrated example of FIGS. 2A-2B, the test platform 20 can additionally optionally include a plurality of legs 36, which can include respective wheels 38, to improve portability of the test apparatus 10.

Each compartment C1-C4 includes at least one heat source 40 positioned at least partially within an interior of the compartment. By having at least one heat source 40 in each compartment C1-C4 with an independent activator (which, in this embodiment includes an ignitor/safety circuit 42), a randomization of the activated heat source 40 (e.g., fire source), as selected by control cabinet 70 can be achieved. In one non-limiting example, the heat source 40 can be a liquid propane (LP) burner having the ignitor/safety circuit 42, safety gas valve 46 and electric gas valve 48. Other suitable heat sources 40 include, but are not limited to, radiant heaters, electric heaters and infrared heaters. In various embodiments, each heat source 40 is capable of achieving temperatures in excess of 1000° C. and heat flux in greater than or equal to 25 or 50 kW/m$^2$. In one example, one 50 MJ, pre-mixed, liquid propane burner heat source 40 is installed at the bottom 24 each compartment on the slat(s) 34 as is best shown in FIGS. 3A-3B. In one example, each burner 40 is connected to an electric-controlled gas control valve/regulator 50, which serves as the activator to selectively ignite the respective burner 40 when selected to be ignited for a test. In gas-fueled heat source 40 embodiments, the system 1 can further include the safety gas valve 46 but in embodiments including other types of heat sources, other heater safety devices 46 can be used including overcurrent protective devices 16 or the like. As best shown in FIG. 2B, in one embodiment, all gas control valves 48 are connected to the regulator 50 that is connected to a tank 52 (schematically shown in FIG. 2B) of liquid propane or other combustible gas. It is also envisioned that each burner 40 can otherwise be connected to its own fuel source in another example. The present disclosure is not intended to be limited to any specific way in which the heat sources 40 are fueled or powered.

Referring in particular to FIGS. 1-2A, the system 1 additionally includes calibrated K-type thermocouples 54 and water-cooled heat flux gauges/sensors 56 installed to/within each compartment C1-C4. If applicable, to cool the heat flux sensors 56, the system 1 can include a coolant tank 58 for storing coolant fluid CF (e.g., Water, glycol or the like, see FIG. 1). The coolant tank 58 is in fluid communication with a tubing system 60, pump 62 operated by pump battery 64, to direct the fluid to each of the heat flux sensors 56. Temperatures and heat flux data obtained from the heat flux sensors 56 can be collected by data logger (within control cabinet 70), programmable logic controller (PLC) or similar that samples at user defined time intervals. In one non-limiting example, each interval is one second.

As best seen in FIG. 1, the system 1 includes a control cabinet 70. The control cabinet 70 can be a housed programmable logic controller or microcontroller in nature and configured to send signals to selected or randomly select one of the heat sources 40 to activate. Additionally, the control cabinet 70 can be configured to send signals to circulate the sensor coolant for sensors such as heat flux sensors 56. Further, the control cabinet 70 can be configured to receive data obtained by any system sensors of the test apparatus 10 and direct it to a human machine interface (HMI) display 72 (e.g., computer monitor or the like) or on or more data storage drives 74 (either storage or cloud data storage devices) for storing the data (generally referenced as "D" in FIG. 1). In other alternate embodiments, the control cabinet 70 can be electromechanical in nature, including housed manual controls and switches for controlling the aforementioned functions of the system 1. With respect to the display and stored data drives 74, these may be wirelessly or in wired connection with the control cabinet 70, as desired. In view of the inherent risk of fire, smoke and heat damage that could potentially occur to the drive receiving the data D, remote or backup (i.e., second) drives 74 may be a suitable risk mitigation. For operation of the control cabinet 70, the control cabinet 70 can include respective human machine interface (HMI)/manual inputs (generally referenced as 76), which can include a touch screen, buttons, switches, or the like. In some embodiments, the system 1 includes a vent hood 80 positioned over the chamber 14 to ventilate smoke and gases/airborne particulate resulting from the experiment(s) conducted with the system 1. Operation of the vent hood 80 can optionally be controlled with the control cabinet 70 in some non-limiting examples.

As schematically shown in FIG. 1, in some embodiments, the test apparatus 10 can include an oscilloscope 82. In some embodiments, the test apparatus 10 can include a time-domain reflectometer ("TDR") 84. In some embodiments, the test apparatus 10 can include a megger 86. The oscilloscope, TDR and megger can optionally be provided to collect additional information and data D during the test of one or more electrical circuits 12, as desired.

The test apparatus 10 is configured to be operated electrically, fed by user provided; variable electrical system voltages and available fault currents. In some examples and methods, experiments can be performed utilizing both harmonized UK and European 230 VAC, and North American 120/240 VAC, single phase electrical sources. Various experiments and methods dependent on electrical source configurations can be conducted at varying voltages, currents, phases and frequencies. The electrical circuit 12 for the test apparatus 10 can be electrically fed by a 10-100 KVA, 120/240 VAC, single phase, transformer in one non-limiting example. The available fault current (Isc) at the electrical circuit 12 can be user defined and applied, in some examples.

Data Collected

In view of the forgoing, it will be evident that the systems 1 and test apparatus 10 of the disclosure can be utilized to collect a wide variety of data D based on the particular objectives of any particular experiment and the specific configuration of the system 1. Such data D is obtainable via the appropriate sensors 82, 84, 86, 88, 90, 92, 94 incorporated into the system 1 and can include, and is not limited to, voltage, current, short circuit current, temperature, heat flux, carbon monoxide level, oxygen level, hydrogen sulfide level, and lower explosive limit.

Data Analysis and Theory

The present inventor theorized and developed a mathematical solution to better understand and explain how an electrical circuit responds to heat and flames of fire impingement for at least the purpose of investigating fires. The fundamental theory is that the electrical distribution system within a structure will respond to heat and flame impingement during the course of fire, thereby acting as a linear detector and generator of physical evidence that the fire investigator may use for fire origin (location) and cause determinations. Therefore, a mathematical model was developed and tested to analyze the testing system of the disclosure. This model is presented as Equation 1, below.

$$A_0 = E° \sum_{n=1}^{\infty} (CnXn) \qquad \text{Equation 1}$$

Where:
- $A_0$=Area of Origin (location) defined by electrical system for a single source, single over current protective device and single region arcing fault.
- $E°$=Electrical Circuit Energized (°=1, energized and °=0, non-energized)
- $C_n$=Compartment located on one-line diagram
- $X_n$=Arc Melt cell location (X=1 for arc melt present in Cn location otherwise X=0)
- n=Compartment or cell (1 to ∞)

EXAMPLE 1

Figure 5:
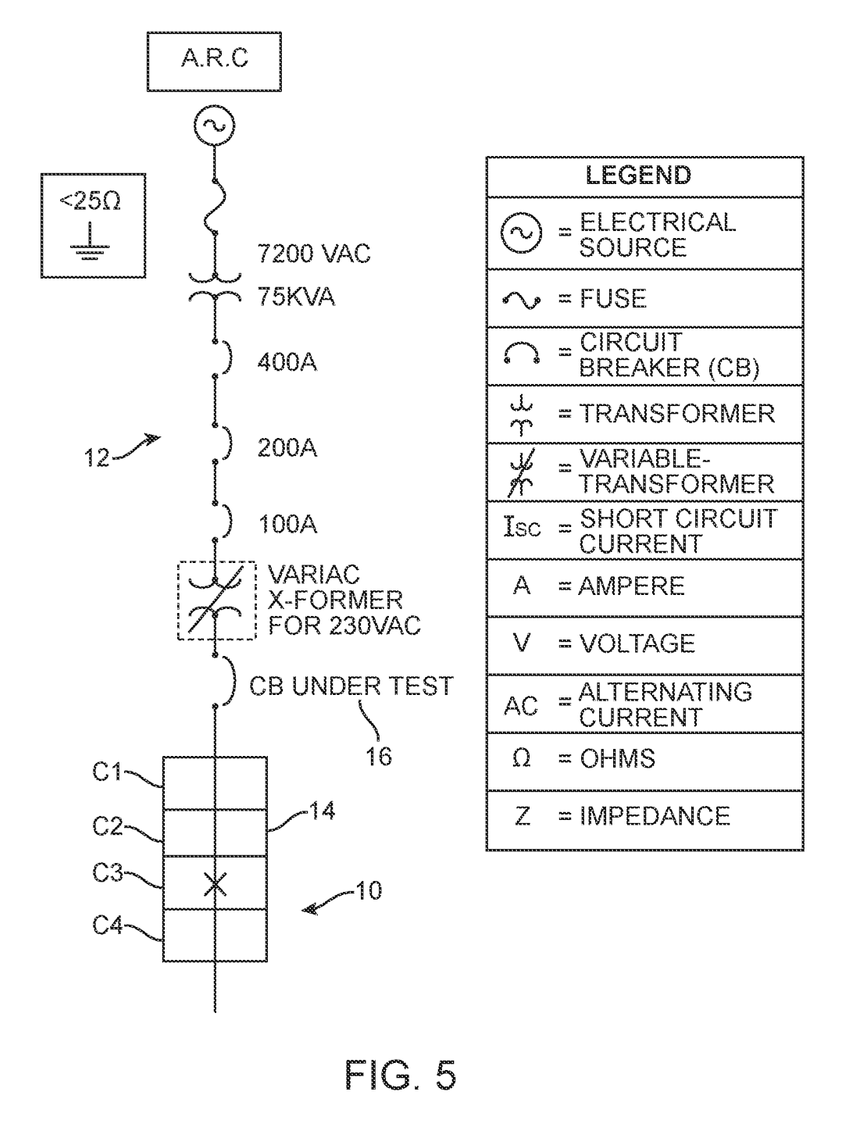
FIG. 5 is an example one line diagram of select components of the system of FIG. 1, which was used to test the electrical circuit in the example of FIG. 4.

As shown in FIGS. 4-5 and with additional reference to FIGS. 1-3B, the selectively energized electrical circuit 12 of this experiment travels through four compartments or cells C1-C4 of the chamber 14. The electrical circuit 12 is configured such that the circuit has the same potential exposure for heat and flames of a fire within each compartment C1-C4. There is sufficient electrical fault current to magnetically trip the over current protective device (i.e., circuit breaker) 16.

As indicated above, the testing system 1 of FIG. 1 was designed and constructed to facilitate testing of electrical equipment and wiring under varying electrical and fire conditions within a controlled environment. The purpose of these experiments was to determine how energized electrical cabling installed within the testing apparatus would respond electrically and spatially to a randomly selected open flame produced by one of the plurality of heat source(s). In this particular example, the heat source(s) were propane burners. Onboard instrumentation for this experiment was incorporated into the system to measure voltage, current, temperature and heat flux data.

Forty two experiments were performed with one test apparatus. Ten experiments were conducted for each size of UK, Twin & Earth 1.0 mm² & 2.5 mm² cabling and twenty-two experiments were conducted for American 1.6 mm (#14 AWG), copper cabling. For the UK single phase experiments, a variable, single phase transformer was inserted into the electrical circuit between the 100 Ampere feeder and the consumer unit. Thereby deriving the UK 230 VAC vs. 240 VAC used in the Americas. Each single-pole circuit breaker was electrically connected to copper cable under test within the test apparatus.

Each cable was cut into 3048 mm (10') lengths and individually installed centered along the length of the test apparatus. Each cable was secured on each end so as not to be influenced by mid-span fittings. The first ten of the American 1.6 mm (#14 AWG), copper cabling experiments were conducted with interior walls installed between each of the cell compartments.

To eliminate confirmation and expectation bias, a random number generator was used to select a test apparatus chamber number between 1 and 4 to correlate to chambers C1-C4. Each randomly selected heat source would be ignited and then allowed to impinge heat and flames on energized electrical cabling installed within the test selected chamber.

The testing protocol was to perform the test until either the OCPD operated or the cabling under test fused and/or melted open. The OCPD operated for each of these experiments. Each circuit under UK, Twin & Earth or American NM electrical cabling were protected by the appropriately sized UK or American circuit breakers.

By applying Equation 1 to the data collected, the area of origin (location) of the fire, based on the physical evidence of the electrical system, is identified as within compartment C3, which is marked with an "X" on the one-line diagram of FIG. 4, which is much more of a precise result than would result from traditional investigative techniques, which are believed to result in an identification of the origin (location) of the fire being in one of compartments C2, C3 or C4. Therefore, the techniques of the present disclosure provide a more precise identification of an origin (location) of a fire.

EXAMPLE 2

In another illustrative example of how aspects of the disclosure can be practiced, a single-family domestic residence suffered substantial damage during a fire. Burn pattern analysis of the fire scene using known techniques indicates that the fire originated within the kitchen. The kitchen included two electrical circuits that fed wall receptacles, a ceiling light (luminaire), microwave and a rangehood. Only one of the two electrical over current protective devices (OCPD) feeding the kitchen circuits was found in the tripped positon. The tripped overcurrent protective device (OCPD) electrical circuit fed the ceiling light fixture and electric rangehood. The scene examination of the rangehood wiring revealed melting of copper wiring that was consistent with electrical arcing. The investigation fire origin (location) hypothesis was that the developing fire originated on the range and impinged on the rangehood electrical wiring resulting in a short circuit and formation of melting consistent with electrical arcing. To test this investigation hypothesis based on collected data, an exemplar electrical circuit(s) that represented the electrical system wiring from the scene was installed and energized within system of FIG. 1. The random heat source selected within one compartment of the chamber generated heat and flame that impinged on the energized electrical circuit under test until such a time that the overcurrent protective device operated. The experiment was repeated multiple times. Subsequent examination of the electrical circuits under test revealed physical evidence in the form of electrical arc sites that were consistent with physical arc sites observed on the electrical circuit wiring within the subject kitchen. The location of the arc sites corresponded to the location of were heat and flames first attacked the electrical circuit under test. Therefore, the data information obtained through these experiments supported the investigation hypothesis that the fire originated in the area of the range hood and not the light fixture (luminaire). Further supporting the Arc Mapping (Arc Survey) methodology defined within NFPA 921—"Guide for Fire and Explosion Investigations. It was subsequently determined that a range burner was in the "on" position.

Additional Applications

It will be understood that the systems, devices and methods of the disclosure can be applied in the forensic study of damage caused to electrical circuits from sources other than fire and heat. For example, systems and methods of the disclosure can be configured to test how an electrical circuit responds to lightning or insulation failure. Additionally, systems, devices and methods of the disclosure can be utilized to test an electrical circuit having mechanical damage (e.g., such as a crimp in the wiring). It is also envisioned that systems and methods of the disclosure can be used to test an electrical circuit having chemical damage. In each of the aforementioned scenarios, a circuit can be prepared with the test apparatus and then subsequently damaged via one or more of electrical damage, mechanical damage or chemical damage, as desired.

EXAMPLE 3

Various methods of the disclosure can include providing a system (e.g., system 1 including one or more components described herein) having a test apparatus (e.g., test apparatus 10 having one or more components described herein) having a chamber with at least one compartment, an energized electrical circuit extending through the at least one compartment, and at least one sensor for each compartment. The methods can optionally include mechanically damaging the electrical circuit and then collecting data relating to properties of the electrical circuit with at least one sensor. In some examples, the test compartment includes the electrical circuit under test and monitor with at least one sensor. In some examples, the chamber includes a plurality of compartments for testing. Methods can also include repeating the steps of activating the mechanical damage mechanism within one compartment and collecting data with at least one sensor. Optionally, the step of damaging the circuit under test is conducted via one or more user provided mechanical damage, electrical damage, or chemical damage mechanisms. In some methods, the step of causing damage to the electrical circuit under test is activated with one of a manual switch, programmable logic controller or micro-controller. In some methods, the test apparatus includes a programmable logic controller or microcontroller control cabinet configured to receive data from the at least one sensor. The control cabinet may be configured to send the data received to at least one drive. Methods can optionally include the step of sending the data to a remote storage device. In various methods, the chamber is portable and can be moved from one location to another for repeated testing. The data collected can include, for example, one or more of electrical voltage and current. In exemplary methods, the test apparatus includes one or more of a voltage sensor, a current sensor, a short circuit current sensor, a temperature sensor, a heat flux sensor, a carbon monoxide sensor, an oxygen sensor, a hydrogen sulfide sensor, explosive limit sensor. In some methods, the test apparatus includes a plurality of electrical circuits extending through the at least one compartment. In various examples, electrical circuit is configured to have the same potential exposure for heat and flames of a fire within the at least one compartment. In some methods, the method includes first developing an investigation hypothesis to test with the system, wherein the step of damaging correlates to the investigation hypothesis so that the hypothesis is tested and analyzed when the electrical circuit is energized.

EXAMPLE 4

Various examples of the disclosure include a portable test apparatus having a chamber defining at least one compartment. The chamber may be elevated above a ground surface. In the context of this patent application, the "ground" can include any floor surface upon which a person or object may walk, stand or be supported, including but not limited to, natural ground, indoor and outdoor flooring materials, pavements, tiles, hardwood, concrete, asphalt, stone and the like. The portable test apparatus can further include an electrical circuit extending through each of the at least one compartment in some examples. The portable test apparatus can further include at least one sensor for each of the at least one compartment in various examples.

In some examples, the chamber defines a plurality of compartments, which may be arranged in series. In some examples the plurality of compartments each have identical dimensions. Some examples include at least one heat source external to the electrical circuit. Some examples include a plurality of heat sources, the test apparatus further comprising a control cabinet configured to activate at least one of the plurality of heat sources. In an example, one heat source is provided adjacent each of the at least one compartment. Various examples include at least one leg having a wheel to elevate the chamber above the ground. In some examples, a bottom of the chamber includes one or more of slats and a wall including perforations.

EXAMPLE 5

Figure 6:
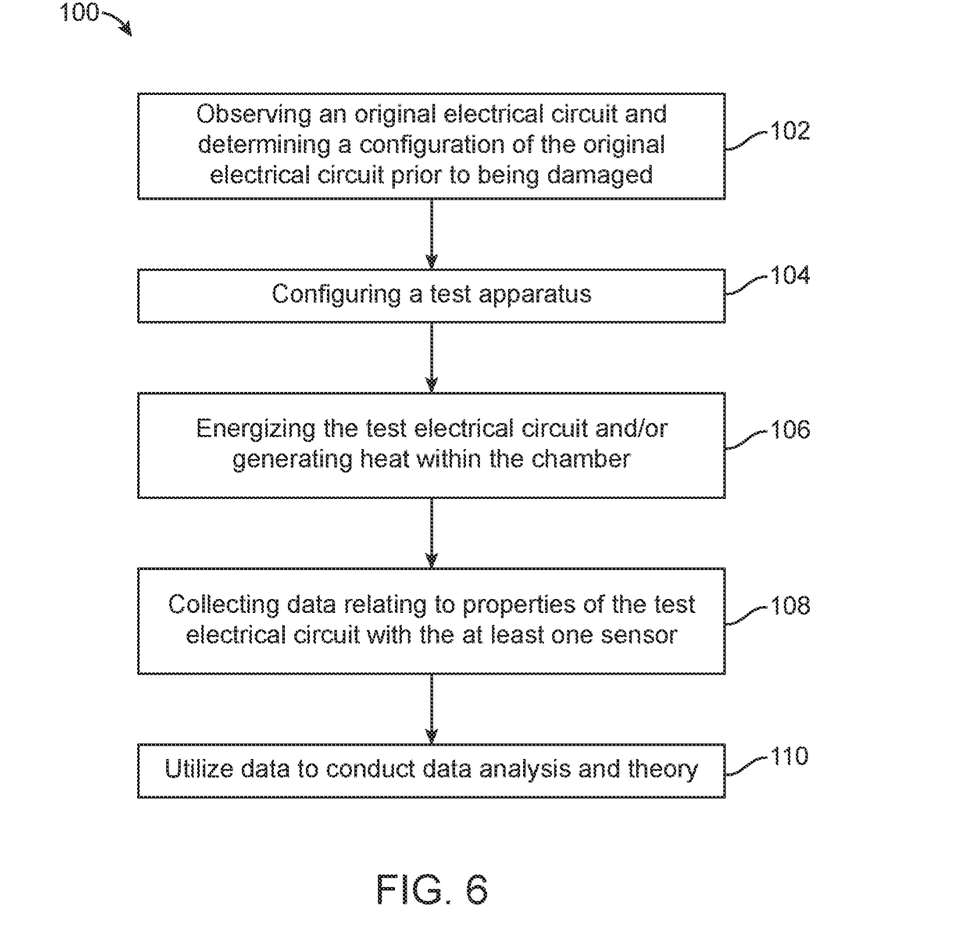
FIG. 6 is an example method of the disclosure.

Referring now in addition to FIG. 6, various example methods such as method 100 include observing an original electrical circuit and determining a configuration of the original electrical circuit prior to being damaged at 102. Some methods include configuring a test apparatus of the disclosure at 104. In one example, the test apparatus includes a chamber defining at least one compartment, a test electrical circuit extending through each of the at least one compartment, the test electrical circuit to include one or more properties of the original electrical circuit, and at least one sensor for each of the at least one compartment. Some methods include energizing the test electrical circuit; wherein the energizing results in generation of heat within the chamber at 106. Example methods include collecting data relating to properties of the test electrical circuit with the at least one sensor at 108. Some example methods further include the step of utilizing the collected data to conduct data analysis and theory at 110 according to any example discussed above.

In some examples, the test apparatus includes at least one heat source positioned adjacent the chamber. In some examples, step of energizing the test electrical circuit is timed so that the test electrical circuit is energized when at least one of the at least one heat source is activated. Some example methods include randomly selecting one of the at least one heat source to be activated. Some example methods include transporting the test apparatus from a first location to a second location. In some examples, the chamber is positioned above a ground surface during the step of energizing the test electrical circuit. In various examples, the chamber is at least partially open to allow entrainment of air within the chamber. In some example methods, the energizing of the test electrical circuit is activated with a control cabinet. In some examples, the chamber includes a plurality of compartments. In some examples, the plurality of compartments are arranged in series. In some examples, the plurality of compartments each have identical dimensions.

Although embodiments of the present disclosure have been described herein, the above description is merely illustrative. Further modification of the invention herein disclosed will occur to those skilled in the respective arts and all such modifications are deemed to be within the scope of the invention as defined by the appended claims.

What is claimed is:

1. A portable test apparatus comprising:
a chamber defining at least one compartment; wherein the chamber is elevated above a ground surface;
an electrical circuit extending through each of the at least one compartment;
one or more test device controllable to create, within each of the at least one compartment; operating conditions of a selected adverse operating event; and
at least one sensor for each of the at least one compartment to measure a parameter indicative of a response of the electrical circuit to the selected adverse operating event.

2. The test apparatus of claim 1, wherein the chamber defines a plurality of compartments arranged in series with each compartment having identical dimensions.

3. The test apparatus of claim 1, wherein a bottom of the chamber includes one or more of slats and a wall including perforations.

4. A method comprising:
observing properties of a damaged original electrical circuit;
configuring a test apparatus having a chamber defining one or more compartments, and compartment having at least one corresponding selectively controllable heat source, the configuring including:
arranging a test electrical circuit to extend through each of the one or more compartments, the test electrical circuit to include one or more properties of the original electrical circuit prior to being damaged, and
configuring a plurality of sensors of the test apparatus, including at least one sensor for each of the one or more compartments;
energizing the test electrical circuit;
activating one or more of the heat sources to heat the corresponding compartments; and
collecting data via the plurality of sensors relating to environmental properties within the one or more compartments and to properties of the test electrical circuit which are indicative of a response of the test electrical circuit to the heating of the one or more compartments.

5. The method of claim 4, wherein the at least one heat source is positioned adjacent the corresponding compartment.

6. The method of claim 5, wherein the step of energizing the test electrical circuit is timed so that the test electrical circuit is energized when at least one of heat sources is activated.

7. The method of claim 5, comprising randomly selecting one of the heat sources to be activated.

8. The method of claim 4, wherein the chamber is at least partially open to allow entrainment of air within the chamber.

9. A portable test apparatus for testing electrical systems, the test apparatus comprising:

a chamber including one or more compartments adapted to receive selectively configured electrical systems for testing;

test devices selectively controllable to create electrical operating conditions of the electrical system and environmental conditions within the one or more compartments which are representative of a selected event;

a plurality of sensors to measure a plurality of parameters indicative of a response of the electrical system to the selected event.

10. The portable test apparatus of claim 9, wherein the test devices include an electrical power source to operate the electrical circuitry according to a set of selected electrical operating parameters.

11. The portable test apparatus of claim 10, wherein the set of selected electrical operating parameters include at least a voltage, an operating current, and an available fault current.

12. The portable test apparatus of claim 9, wherein the electrical system comprises an electrical circuit including at least a circuit breaker and electrical wiring.

13. The portable test apparatus of claim 12, wherein the electrical circuit extends through each of the one or more compartments.

14. The portable test apparatus of claim 9, wherein the electrical system comprises electrical devices representative of an electrical appliance.

15. The portable test apparatus of claim 9, wherein the test devices include a heat source disposed in each of the one or more compartments controllable to create a selected event representative of a fire.

16. The portable test apparatus of claim 9, wherein the test devices include a mechanism operable to mechanically impact the electrical system to create a selected event representative of a crimped wire.

17. The portable test apparatus of claim 9, wherein the test devices include an electrical power source to operate the electrical circuitry according to a set of selected electrical operating parameters to create a selected event representative of an electrical surge.

18. The portable test apparatus of claim 17, wherein the electrical surge comprises one of a lighting surge and a fault condition.

19. The portable test apparatus of claim 9, wherein the plurality of sensors comprises voltage sensors, current sensors, temperature sensors, heat flux sensors, carbon monoxide sensors, oxygen level sensors, hydrogen sulfide sensors, pressure sensors, insulation resistance sensors, time-domain reflectometers, and oscilloscopes.

20. The portable test device of claim 9, including a controller configurable to collect data from the plurality of sensors and to operate the test devices to create the electrical and environmental operating conditions of the selected event.

* * * * *